Feb. 26, 1963  G. M. SIMPKINS  3,079,178
FLUSH COUPLING ASSEMBLIES
Filed April 13, 1959  3 Sheets-Sheet 3
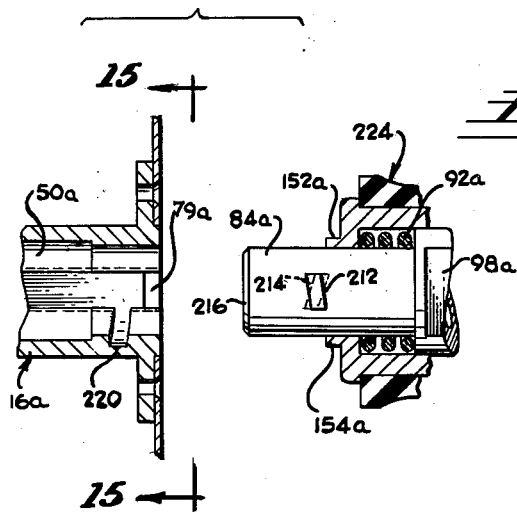
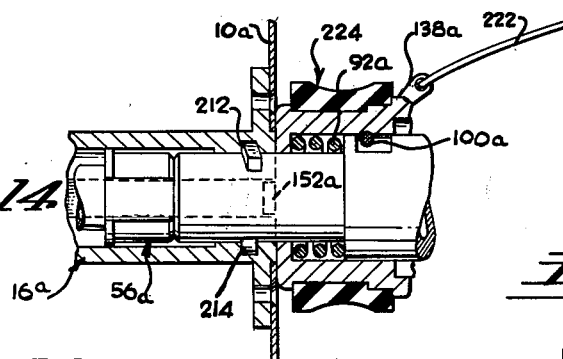
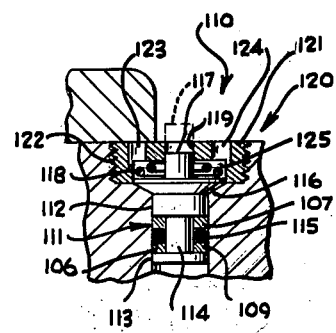
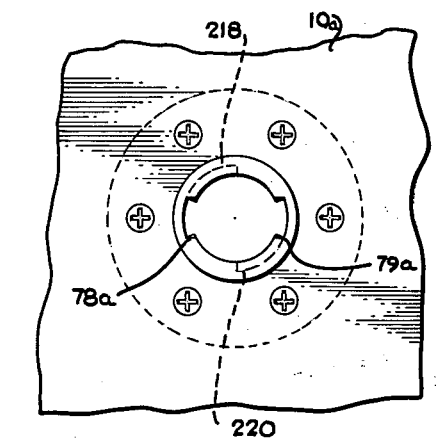
INVENTOR.
GIDEON MAC SIMPKINS
BY
ATTORNEYS United States Patent Office 3,079,178
Patented Feb. 26, 1963

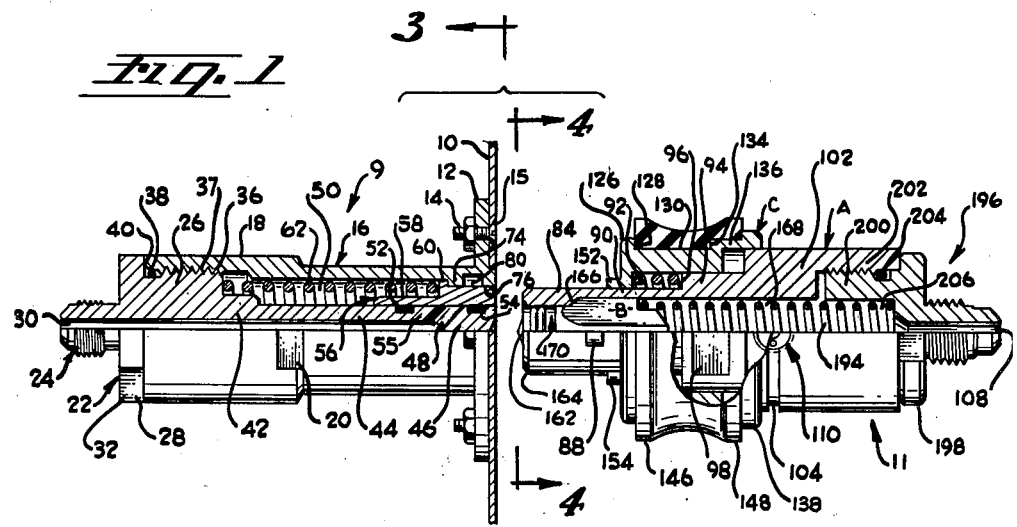

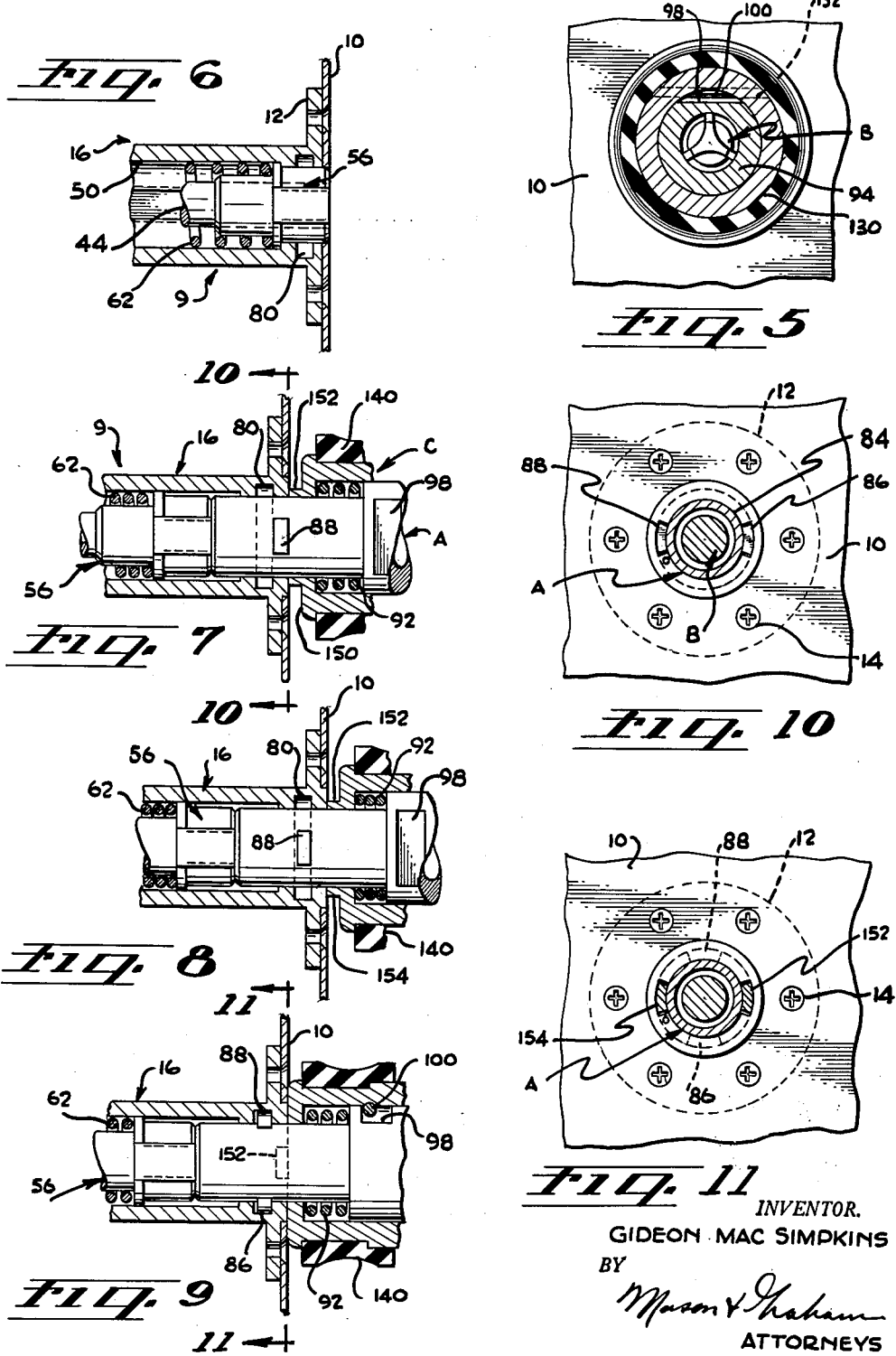

3,079,178
FLUSH COUPLING ASSEMBLIES
Gideon Mac Simpkins, Chatsworth, Calif., assignor to Airaterra, Glendale, Calif., a corporation of California
Filed Apr. 13, 1959, Ser. No. 806,031
1 Claim. (Cl. 285—83)

This invention relates to complementary flush coupling units and nipple attachment assemblies, jointly and individually.

It is an object of the invention to provide a novel coupling assembly mountable within a supporting structure, whether such structure be a tank or a conduit connected to a more remote receptacle (or combustion orifice), so as to have its external coupling face disposed entirely flush with the outer face of the supporting structure. The great advantage of such construction in structures whose outer skin in exposed to fluid flow, such as aircraft and marine vessels, will be readily apparent, but in addition such flush coupling assemblies possess inherent safety advantages in connection with stationary mounting or land-based structures. Such flush couplings are generally used on the receiving (rather than the delivery) conduit and accordingly a particular advantage of my flush coupling is that it immediately and automatically seals itself against return fluid flow or dripping from the severed line upon uncoupling of the delivery conduit.

A further object of the invention is to provide a nipple coupling assembly keyed for quick connection to my flush coupling as the delivery conduit therefor.

Another purpose resides in the provision of a closed-end conduit mounted in such flush coupling assembly and having lateral apertures normally sealed by a retractable sleeve disposed therein and which is automatically unseated upon coupling my nipple assembly therewith.

A unique advantage of the nipple assembly resides in the construction of self-locking means operable merely by a quarter-turn of the thrust-inserted assembly. A further advantage resides in this particular construction which unlocks for quick rotational uncoupling merely by manual retraction of a slidable abutment collar.

Yet another object is to provide such a coupling assembly having additional locking means against accidental uncoupling during fluid flow through the connected conduit, such locking means operating in response to fluid pressure in the delivery line; thus, flow must first be turned off in the coupled delivery conduit before the locking collar can be retracted to permit rotational uncoupling of the unit.

Still another purpose resides in the unique construction of a poppet valve which is automatically unseated by thrust engagement of the nipple assembly and automatically reseated in the delivery conduit upon retraction of the nipple. Such valve is longitudinally operable in a conduit adjacent a segment of decreased internal diameter of the line, by reason of a cylindrical head section which, being seated, plugs the section of decreased diameter, and carries a posterior section formed of longitudinal fins of greater composite diameter than the head, along which fluid flows when unseated.

Yet another object resides in the provision of novel interacting structures for simultaneously unseating conduit closure valves in the coupled nipple and housing assemblies, respectively, by means of the thrust engagement therebetween.

Still another feature comprises visual indicating means to show the locked position of the coupled nipple assembly, as well as audible means for signaling the completed locking action of the unit.

A further purpose resides in a modified construction which permits remote uncoupling of the nipple assembly from the flush coupling by means of a lanyard. Such modification has the additional advantage of remaining coupled only when in locked position so that the hazard of accidental uncoupling is still further reduced or eliminated. Still another object is to provide interacting conduit-coupling assemblies particularly adapted to carry fluid under any pressure up to several thousand p.s.i. such as is found in missile propellant systems; the coupling assemblies are accordingly especially adapted to carry fluid rocket fuel whether gaseous or liquid.

Other objects and advantages of the invention will be apparent from the following description and claim, the novelty consisting in the features of construction, combination of parts, the unique relations of the members and the relative proportioning, disposition, and operation thereof, all as more completely outlined herein and particularly pointed out in the appended claim.

In the drawings, which form part of the present specification:

FIG. 1 is a lateral elevational view of my flush coupling assembly and nipple assembly each shown in alignment to be connected, partly in axial section and with some portions of the nipple assembly broken away;

FIG. 2 is a similar view of the two assemblies connected in locked position for fluid flow therethrough, the nipple assembly being rotated 90° clockwise from its uncoupled position of the previous figure;

FIG. 3 is an elevational view of the outer abutment face of the coupling unit mounted flush with a surrounding structural surface as seen along the line 3—3 of FIG. 1;

FIG. 4 is a corresponding end elevational view of the nipple unit as viewed along the line 4—4 of FIG. 1;

FIG. 5 is a transverse sectional view taken through the collar of the npple assembly along the line 5—5 of FIG. 2;

FIG. 6 is an axial section through the flush coupling housing with some inner structures shown in elevation;

FIG. 7 is a similar view showing the nipple inserted to the first coupling position;

FIG. 8 is a similar view with the nipple collar retracted and the nipple inserted to the second coupling position;

FIG. 9 is a similar view with the inserted nipple assembly rotated and its collar now extended and seated in locked position;

FIG. 10 is a view of the abutment face similar to FIG. 3 but taken with the nipple assembly inserted to the first coupling position and accordingly shown in transverse section along the line 10—10 of FIG. 7;

FIG. 11 is a similar view taken through the locked assemblies along the line 11—11 of FIG. 9;

FIG. 12 is a side elevational view of my poppet valve;

FIGS. 13, 14 and 15 show a modified construction of my flush coupling assembly and interlocking nipple connection wherein the nipple-engaging lugs and corresponding seating groove of the housing assembly are essentially helical instead of annular, FIG. 13 showing incomplete portions of the uncoupled assemblies in axial section with some structures in elevation, FIG. 14 showing the corresponding coupled units in locked position;

FIG. 15 is an elevational view of the abutment face of the coupling assembly and adjacent supporting structure as viewed along the line 15—15 of FIG. 13; and FIG. 16 is a vertical axial section, partly in elevation, of the fluid pressure-responsive lock seen in the nipple assembly of FIG. 2;

More particularly describing the invention, referring first to the flush coupling assembly, designated 9, there is illustrated an outer supporting structure or "skin" 10, to the inner face of which is attached a flange 12 as by a circumferential series of screws 14 or rivets inserted through corresponding axially directed apertures 15 so as to dispose their heads flush with the skin, the flange forming the abutment end of a tubular housing 16. The latter is circumferentially enlarged at its posterior section 18 and provided with an opposing pair of parallel flat surfaces 20 for operative engagement of the same by a wrench (not shown).

A posterior closure plug 22 is provided in the housing, being formed with an axially projecting, externally threaded nipple 24 for attachment to a fluid line (not shown) within the supporting structure 10. The plug has an inner body portion 26 and an intermediate flange 28. It also has an axial passage or base 30 terminating in ports 48 to form a continuous channel for passage of fluid therethrough. Flange 28 is also formed with an opposing pair of external, tangential, parallel surfaces 32 for engagement by a wrench to assemble the same. The body portion 26 is externally threaded at 36 to engage corresponding threads 37 on the inner circumference of the housing 18, a sealing O-ring 38 being disposed at the crotch of the inner abutment face 40 of the flange.

Anteriorly within the housing 16, the body 26 of the plug has two successively circumferentially restricted, forward extensions 42, 44, the latter having a closed abutment end 46 projecting through the support wall 10 so as to be flush with the outer face thereof, and having the three lateral ports 48 spaced equidistant about the periphery of a theoretical cone which has its apex in the center of axial channel 30. Axially spaced apart from the ports 48 in each direction are one or more sealing O-rings 52 and 54, respectively.

Also located within the housing 16 and longitudinally slidable along its bore 50, inward from a position flush with the "skin," is an annular sleeve which receives the extension 44 of the body 26, to the extent that, upon retraction of the sleeve, the terminal, circumferentially apertured section 55 of the neck 44 projects beyond the retracted sleeve uncovering ports 48. The inner end of sleeve 56 is radially restricted at 58 so as to form an annular abutment shoulder 60 adapted to engage one end of a helical compression spring 62 which is disposed about the sleeve neck 58 rearward to the extension 42 (which section is formed with a similar circumference) to hold them axially apart. When the spring is compressed in the process of coupling the nipple assembly (as hereafter described), sleeve 56 is correspondingly slid back over the encompassed plug body 44, from a sealing position, overlying the section 55 with its ports 48 and their adjacent fluid seals 52, 54, (FIG. 1) to a retracted position (FIG. 2) within the housing 16, which completely clears the apertures to permit fluid flow therethrough.

A particular construction of the sleeve 56 resides in a circumferentially opposed pair of convex, longitudinal keys 64, 66 (FIG. 3) fixedly mounted along the outer perimeter of the sleeve, the side walls 68 thereof being slanted outward along a radial line corresponding to the circumferential curvature of the key and sleeve and the forward ends 70 thereof normally being disposed flush with the corresponding, outer abutment end of the sleeve. Both sleeve and keys are received in corresponding apertures of the tubular housing 16 so as all to be disposed flush with the adjacent outer face of the skin 10 thereof when the assembly is in uncoupled or disconnected position, being there lodged by abutment of the shoulder 60 against inwardly projecting annulus 74 of the housing and the keys 64, 66 being seated within corresponding keyways 78 formed along the inner housing face. Thus the flush coupling assembly, mounted within its contained receptacle or supporting member 10 is automatically closed against back flow and at the same time ready for instant thrust coupling connection to a feed line, without any manual manipulation of valves or even the necessity of checking their position.

The terminal end of housing 16, adjacent attachment flange 12 is also formed with an inwardly opening, peripheral keyway or groove 80 having its floor or depth coextensive with that of the axial or longitudinal keyways 78 and provided with a shoulder or stop pin 82 (FIG. 3) to limit rotation of a coupling member inserted therein.

The nipple coupling assembly adapted for quick manual connection and disconnection to the above-described flush coupling assembly 9, is designated generally by numeral 11. It includes a tubular body or nipple A having a spring-actuated poppet valve B (FIG. 12), axially slidable therein adjacent the contact end, and an external, spring-loaded locking collar C, anchored against independent rotation and limitedly slidable therealong so as to abut against the housing skin 10 when assembly 11 is connected to assembly 9.

The forward end 84 of the tubular nipple A has an external and internal diameter generally corresponding to the outer end of the keyed sleeve 56 (apart from the key portion), and is adapted to abut thereagainst and in such thrust-engagement with the sleeve, be slidingly received within the terminal aperture 76 of the housing 16, effecting compression of the spring 62 by movement of the forward end 84 thereagainst. Spaced axially back from the nipple end, the nipple tube is provided with an outwardly projecting, diametrically positioned pair of engaging lugs 86, 88 (FIG. 4) having a radial height, lateral taper and peripheral location corresponding to that of the sleeve keys 64, 66 so as to be insertable into the corresponding keyways 78, 79 (FIG. 3) (without contacting the keys) and thereupon be rotated 90° in the circumferential channel 80 to abut in locking position against the stop pin 82.

Axially posterior to the lugs 86, 88 the nipple is formed with a length 90 of similar external circumference adapted to receive a helical compression spring 92 thereabout. An adjacent peripherally enlarged segment 94 provides one abutment shoulder 96 for the spring and is additionally formed with a tangential, flat, cut-away surface 98 adapted to have a tangentially directed locking-pin 100 (FIG. 2) slide transversely back and forth therein (as hereafter described). An adjacent stepped section 102 of still greater external diameter is formed with an outer circumferential marker line or channel 104 which is here located to provide a visual marker, brightly colored if desired, for a purpose subsequently described.

Along the marker line 104 disposed in a generally radial bore 106, extending outward from the axial channel 108 of the nipple, there is seated a pressure-actuated valve or lock 110. As here illustrated (FIG. 16), it consists essentially of a plug section 111 formed of two cylindrical portions 112, 113 spaced axially apart by a reduced cylindrical neck 114 about which is disposed one or more sealing O-rings 115, a pair of backup rings 107, 109, the plug section being axially movable within the bore 106 while maintaining its fluid seal of the same. Radially outward, the lock valve is formed with a conical seating flange 116 succeeded by a cylindrical lock-pin 117 centered on the outer face thereof and encircled by a helical spring 118 disposed normally to hold the pin and valve retracted within a central aperture 119 of a housing plug 120. The latter is formed by an annular ring 121, apertured at 119 to receive the lock-pin 117 and threadedly mounted in a corresponding socket 122 of the nipple housing 102, which socket is axially aligned with, but of greater diameter than the bore 106, the annulus being formed with a pair of air passages 123, 124 to avoid any vaporlock or vacuum force in the spring chamber 125.

Accordingly the locking pin 117 is seen to be extensible and retractable in its bore 119 in response to fluid pressure in the delivery line channel 108. Desirably, pressure of the fluid flowing through the nipple assembly will extend the locking pin 117 in response to whatever predetermined load the spring 118 is set for and upon flow being turned off, the spring will again seat the lock-pin valve unit 110. This prevents uncoupling of the assembly while fluid is flowing, as will be explained.

The generally cylindrical, tubular collar C is formed with an anterior, radially projecting shoulder 126 which at its inner face 128 forms one side of a peripheral trough or channel 130 which extends axially along a major portion of the collar length and is tangentially drilled at 132 to receive the roll pin 100 which, when seated in the nippled slideway 98, serves to lock the collar against rotational movement about the nipple A. The channel 130 is terminated by the radial wall 134 which forms one end of a stepped section 136 of outer circumference equal to that of the shoulder 126, the raised portion in turn ending at a terminal flange or abutment shoulder 138. Disposed about the collar between the opposing shoulders 126 and 138 is an elastomeric bumper ring 140 formed of a thicker band 142 frictionally seated in the trough 130, and a somewhat thinner extension 144 overlying the radially enlarged annulus 136. A terminal bead 146, 148 about each edge makes the bumper easier to grasp, while the ring as a whole additionally serves to hold the roll pin in place.

Outwardly projecting from the forward radial face 150 of the collar C are a pair of engaging lugs 152, 154, (FIG. 4), circumferentially positioned 180° apart and of similar radial elevation and transverse width and curvature to that of the nipple lugs 86, 88 and to the keys 64, 66 of the sliding sleeve 16, so as to be insertable into the keyways 78 from the external face of the skin 10. The collar C is secured on the nipple (by means of the roll pin 100) in such position that the lugs 152, 154 are at right angles to the nipple lugs 86, 88 (that is, rotated 90° therefrom), with their lead edge lying along a circumferential line about the nipple 84 which also defines the posterior edge of the nipple lugs 86, 88.

Posterior to the lugs 152, 154, within the collar C, there is formed a circumferential channel 156 overlying the nipple body and serving to house a helical compression spring 92 having its opposing ends seated against the nipple shoulder 96 and a forward inwardly projecting flange 160 of the collar. The spring 92 allows the collar and bumper unit to be axially retracted along the nipple (i.e. without rotation) a distance equal to the amount of axial displacement of the nearer edge of the groove 80 of the housing 16 inward from the outer face of the latter. Accordingly the nipple end 84 may be inserted into the channel of housing 16 (pressing back the sleeve 56 against the spring 62) until the nipple-engaging lugs 86, 88 are received in the corresponding housing keyways 78 and the lead edge of the locking lugs 152, 154 abut against the projecting outer face of housing 16 (i.e. flush with the skin 10) (FIG. 7). Then by inserting the nipple end 84 into the housing the collar is automatically retracted against the spring 92 and the nipple lugs 86, 88 are received in the inner peripheral channel 80 (FIG. 8). Then a 90° rotation of the whole nipple assembly turns the lugs to the abutment pin 82 and brings the locking lugs 152, 154 to the entrance of the keyways 78 into which they enter with an audible snap by expansion of the spring 92 (FIG. 9). From this locked position, an uncoupling is simply effected by retracting the collar C to withdraw the lugs 152, 154, and then rotating the nipple assembly 90° counterclockwise.

The nipple A itself is formed with a somewhat radially restricted, generally cylindrical aperture 162, its lead edge conveniently chamfered at 164 and its inner terminal formed by an angular shoulder 166 which defines the forward extremity of radially enlarged cylindrical chamber 168 in which is housed an axially slidable, poppet valve 170.

The projecting, cylindrical nose 84 of the nipple lends itself to automatic centering or mutual aligning of the two conduit lines being connected thereby, the chamfered or conical lead edge 164 promiting easy location of the housing socket 76 so that the operator need not look for it closely or precisely align it visually to obtain insertion of the nipple nose.

The poppet 170 (FIG. 12) conveniently made of corrosion resistant steel, is formed with a generally cylindrical head section 172, an adjacent restricted cylindrical neck 174 adapted to receive a pair of sealing O-rings 176, 178 (FIG. 2) and a subsequent cylindrical section 180 of the same radius as section 172, all of which are slidably received within channel 162, with the external face 182 of the poppet (which may be either flat or convex as desired) disposed substantially flush with the nipple end when the valve is in "closed" position, as when the nipple assembly is uncoupled. Posteriorly the poppet is formed with three angularly rising shoulders 184, conveniently slanted from the axis, spaced circumferentially equidistant apart and adapted to abut against the correspondingly sloped shoulder 166 when the poppet valve is seated in sealing position within the nipple. The respective shoulders continue longitudinally to the rear, forming ribs 186 which jointly define between them three corresponding concave fins 188, a circumferential line embracing the edges of the three ribs corresponding approximately to the internal circumference of the surrounding chamber 168. The fins serve to guide the poppet for longitudinal movement within the chamber, while the concave channels formed parallel therebetween, direct fluid flow thereover when the poppet valve is in open position. Posteriorly each rib terminates in a cutout step or shoulder 190 and central stud section 192 which jointly form a seat for one end of a coil spring 194.

The nipple assembly is completed by a rear closure plug 196 consisting of a flange 198 having an inwardly projecting, externally threaded neck 200 adapted to be inserted into and threadedly engage the interior of the nipple housing at 202, being provided with a conventional sealing ring 204. The plug body is drilled inward from its free end to form a chamber 206 which seats the rear end of the spring 194 (which in turn at its forward extremity bears on the poppet 170). A narrower apertured nipple 210 projects outward from the opposite face of the flange to provide threaded attachment for a conventional inlet fluid line similar to nipple 24.

Accordingly, the flow of liquid through the coupled assemblies may be traced thus: Incoming fluid enters the feed line nipple 210 through bore 108 passing into the chamber 206 (in contact with the poppet spring 194) then lengthwise along the fins 186 which, as part of the poppet valve, have been axially retracted in chamber 168 by pressure of the cylindrical head 46 against the forward face 182 of the poppet B. The head section 172—180 of the poppet valve has likewise been displaced rearward from the aperture section 162 of the nipple A by reason of the insertion of the nipple 84 into the flush coupling assembly, pressing back the keyed sleeve 56 so as to uncover the three apertures 48. Liquid accordingly flows lengthwise along the outer face of the poppet head 172—180, past the sealing rings 54 (now within the enlarged nipple chamber 168 and no longer functioning as seals) and into the lateral apertures 48 so as to be carried through the bore 30 through the neck sections 44, 42 of the closure plug 22, and out the attachment nipple 24.

The fluid-pressure-responsive lock of FIG. 16 is set to operate at a determined pressure measured by the seating tension or force of spring 118. Higher pressure of fluid in the coupled lines thus causes the locking pin 117 to project radially from the nipple housing 102 adjacent the rear shoulder 138 of the locking collar C. This prevents retraction of the collar which could otherwise withdraw the seated lugs 152, 154 from within the keyways 78, where their lodgment prevent rotary uncoupling of the nipple assembly.

In the modification shown in FIGS. 13–15, the nipple end 84a is provided with helically directed engaging lugs 212, 214 diametrically located on the outer face thereof and spaced axially back from the abutment end 216 of the nipple, similar to the corresponding lugs 86, 88 of the previous embodiment. The lugs are adapted to be receivable in correspondingly directed, "quarter-turn" grooves 218, 220 formed in the inner face of the tubular housing 16a. Otherwise this flush coupling assembly is constructed similar to that of FIG. 1, with axial keyways 78a, 79a for insertion of the engaging lugs 212, 214 and (after 90° rotation of the nipple assembly) for insertion of the locking lugs 152a, 154a, of the locking collar into corresponding axial keyways.

However, with this construction, the nipple in effect screwing into the coupling, it will be apparent that when it is not positively held seated (by locking lugs 152a, 154a), the force of the sleeve poppet springs 62, 194 will tend to cause it to automatically unscrew or uncouple. Accordingly means are provided for remote disconnection of the same, by means of a lanyard 222 secured to the rear shoulder 138a of the locking collar. Simply by pulling the lanyard (preferably at an angle to the axis of the nipple coupling), the collar 224 is retracted against the spring 92a, withdrawing the locking lugs 152a 154a and prompting the nipple assembly to "unwind" or uncouple.

Although I have illustrated and described two preferred forms of my invention, I contemplate that various changes and modifications can be made therein without departing from the invention, the scope of which is indicated by the following claim.

I claim:

A coupling assembly for a fluid line comprising a tubular housing formed with an annular axially projecting, centrally apertured nipple section, and an adjacent radially enlarged section, said nipple section being formed with a diametrically positioned pair of axially directed, engaging lugs projecting outward from its circumference and spaced axially back from the free end thereof, said enlarged section being formed externally with a radially restricted neck adjacent said nipple and a tangentially directed flat surface separated therefrom by an intervening shoulder so as to form an axial slideaway along the flat surface for a transverse locking pin, a collar slidably mounted on said enlarged section with a transverse pin tangentially traversing the same in sliding registration with said flat surface, intermediate its ends, said collar having a forward radial flange disposed about said nipple section posterior to said engaging lugs, a coil compression spring disposed about the neck of said tubular section within said collar between the inner face of the collar flange and said shoulder, a pair of diametrically positioned, axially directed, locking lugs disposed on the forward face of said collar flange at positions of 90° rotation from the engaging lugs and having common radial height and segmental dimensions therewith, and an elastomeric bumper ring externally disposed about said collar so as simultaneously to retain said locking pin and provide a manual engagement surface for axial movement of the collar.

References Cited in the file of this patent

UNITED STATES PATENTS

| | | |
|---|---|---|
| 656,629 | Cotter | Aug. 28, 1900 |
| 699,366 | Bowes | May 6, 1902 |
| 959,226 | Keys | May 24, 1910 |
| 1,069,146 | Kennedy | Aug. 5, 1913 |
| 1,443,675 | Bowler | Jan. 30, 1923 |
| 2,245,847 | Bagby | June 17, 1941 |
| 2,304,038 | Thompson | Dec. 1, 1942 |
| 2,461,705 | Stranberg | Feb. 15, 1949 |
| 2,463,405 | McMaster | Mar. 1, 1949 |
| 2,653,792 | Sacchini | Jan. 30, 1953 |
| 2,689,138 | Scheiwer | Sept. 14, 1954 |
| 2,804,319 | Weber | Aug. 27, 1957 |

FOREIGN PATENTS

| | | |
|---|---|---|
| 551,448 | Canada | Jan. 14, 1958 |